INVENTOR:
HANS HEIL,

BY Nathan Lomfeld
HIS ATTORNEY.

INVENTOR:
HANS HEIL,
BY Nathan J. Lomfeld
HIS ATTORNEY.

United States Patent Office 2,925,524

Patented Feb. 16, 1960

2,925,524

METHODS AND STRUCTURES CORRECTING FOR BEAM DEFLECTIONS IN A TELEVISION PICTURE TUBE

Hans Heil, Syracuse, N.Y., assignor to General Electric Company, a corporation of New York Application March 16, 1956, Serial No. 571,972

11 Claims. (Cl. 315—8)

My invention relates to television picture tubes and more particularly to new and improved structures and methods for eliminating undesired effects of the earth's magnetic field on the color purity of color television tubes.

Because the earth's magnetic field has marked undesirable effects on the degree of color purity obtainable in color television picture tubes, corrections have to be made to compensate or offset these effects. As is well known, the earth's field exerts a force on electron beams such that said beams tend to be deflected from a straight line path. In a picture tube the magnitude of deflection caused by the earth's magnetic field varies over the screen of the picture tube as will be explained in detail hereinbelow. It is this variation of deflection which complicates the problem of correcting for the earth's field.

For proper operation of said picture tubes and to obtain good color purity therein, each of the electron beams should impinge on predetermined color producing elements on the screen. Therefore, the non-straight line path of each of the electron beams must be corrected for or the electron beams may impinge on other than the predetermined color producing elements and color impurities will result. Particularly pronounced are the electron beam deflecting effects of the earth's field as noticed in those color television tubes employing low accelerating voltages in the order of 7,000 volts, in, for example, tubes of the type known as post acceleration tubes and which are typified by having an electrostatic lens structure adjacent the screen of the tube for the purpose of focusing the beam onto the screen.

It is, accordingly, a principal object of the present invention to provide new and improved methods and structures for correcting for the effects of the earth's magnetic field on the color purity of a color television picture tube.

It is another object of the invention to provide new methods and structure for correcting for the variation of electron beam deflection on the screen of a picture tube caused by the earth's magnetic field.

In the attainment of the foregoing objects of my invention, I provide an electromagnetic structure for color television picture tubes consisting of a pair of coils, each of the coils disposed substantially horizontally and in vertical alignment with each other. The coils are adapted to be energized by direct currents to develop magnetic fields to correct for the effects of the earth's magnetic field. Further, I provide a method of positioning the luminescent elements on the screens of picture tubes which by shifting and tilting the printing master compensates for the effects of the vertical intensity component of earth's magnetic fields.

Other objects and advantages will become apparent after a consideration of the specification and the drawings in which.

The earth's magnetic field in the northern hemisphere is characterized by magnetic lines of force dipping downward and toward what is commonly referred to as the earth's north magnetic pole, but which by electromagnetic theory is actually a south magnetc pole. At a point of one of the lines of force a vector H may be drawn to represent the direction and intensity of the earth's field, Figure 1. In the figure the distance between geographical north and the magnetic pole is exaggerated for purposes of clarity. The vector H may be separated into vertical and horizontal components, $H_v$ and $H_h$ respectively. The angle $i$ between the vector H and the horizontal component $H_h$ is known as the inclination or dip angle. In the United States the inclination or dip angle varies from about 55° in the southern portions to 75° in the northern portions. The angle between geographical north and the horizontal intensity extension of the field vector is known as the declination angle. For the contintental United States the horizontal intensity varies from about .27 gauss in the southern parts to about .16 gauss in the northern parts. The vertical component may be readily determined from the relation:

$$H_v = H_h \tan i \quad (1)$$

As will be explained in detail subsequently, both the vertical intensity component and the horizontal intensity component effect color purity.

The effects due to the vertical intensity component and the corrections therefor will be considered, then the effects due to the horizontal intensity component and the corrections therefor will be considered. Although the deflections caused by both components cause color impurities, said deflections are small enough such that they can be considered separately and then superimposed to determine the total effect.

An electron moving in a uniform magnetic field has a force exerted thereon by the magnetic field which tends to move the electron at right angles to the field. To determine readily the direction in which electrons will be deflected we may use the well known Fleming left hand rule as given in Industrial Electricity, by Nadon and Gelmine, published for the United States Armed Forces by D. Van Nostrand Company. Since the moving electron constitutes a minute electric current, the electron experiences a sidewise force just as does a wire carrying current. The thumb, the forefinger and the middle finger are extended at right angles to one another and if forefinger points downward in the direction of the vertical intensity, the thumb points in the direction of the initial motion of electrons, then the middle finger will point to the left of a viewer facing the source of electrons and in the direction toward which the electrons will be deflected.

Figures 1, 2:
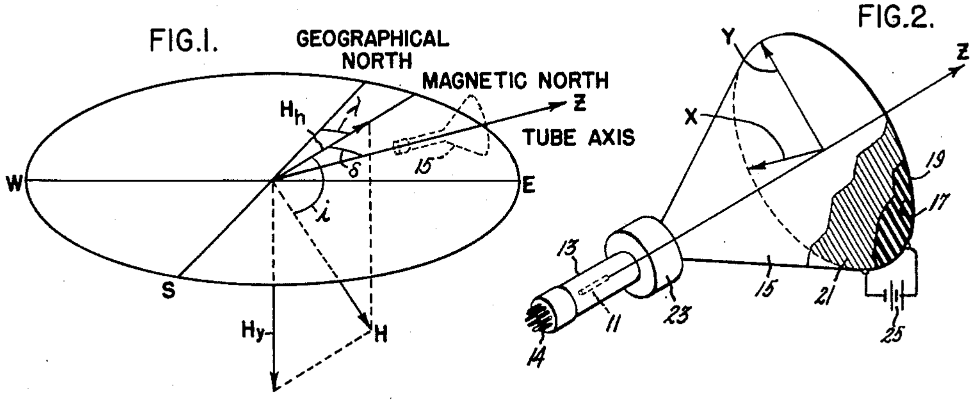
Figure 1 is a schematic diagram of vectors representing the lines of force of the earth's magnetic field at one point, and showing the outline of a picture tube oriented at angle $\delta$ with respect to the horizontal intensity component of the earth's field.
Fig. 2 is an enlarged view of the picture tube of Figure 1.

For various reasons relating to the better operation of post acceleration color television tubes an embodiment of a post acceleration tube has been selected which includes a luminescent screen composed of a plurality of triplets of different color producing luminescent stripes. In Figure 2 a picture tube 15 is shown having a plurality of electron guns 11 schematically located in neck portion 13 of said tube and having a screen consisting of a plurality of vertically oriented spaced parallel luminescent stripes and including a conductive coating 17 thereon disposed on face panel 19. A grill member 21 is interposed between the guns 11 and screen 17. Deflecting means 23 are disposed around the neck 13 to suitably deflect the electron beams. A source of voltage 25 provides an accelerating potential between screen 17 and grill 21. The various members which position the guns in neck portion 13 are not shown, neither are the various connections to the pin connectors 14 since these elements are, per se, not a part of the invention and any suitable conventional means may be used as desired. Assuming an electron beam is deflected a small amount in a vertical direction by the earth's magnetic field little if any change in color purity would be noticed, since the only effect would be that the beam impinges somewhat higher but on the same luminescent stripe as a beam that is not subjected to vertical deflection. However, each of the vertical stripes is only approximately 0.012 inch wide so that even a small shift of the electron beam in the horizontal direction will cause the beam to impinge on a different color producing luminescent material, and thus markedly affect the color purity. It is assumed throughout the description that the tube is maintained with the axis of the tube in a horizontal position.

Figure 3:
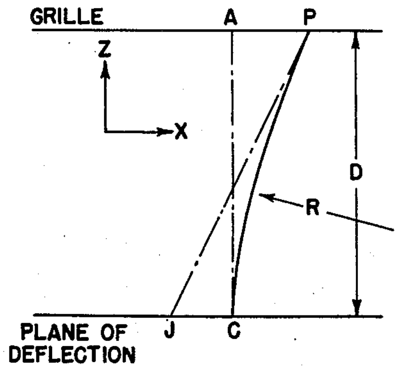
Figure 3 is a diagram showing the path of an axial electron beam deflected by the vertical intensity component of the earth's magnetic field.

Due to the forces developed by the vertical intensity of the earth's field, the electron beams are deflected in a path corresponding to the arc of a circle having a radius R. Figure 3 shows diagrammatically the path of an electron beam between the plane of deflection and the grille which path has been deflected from an original axial course CA to curved path CP. The plane of deflection is a plane through the tube deflecting means parallel to the grille and determined on the tube axis by the point of intersection of the initial electron paths with the electron paths after deflection by the tube deflecting means. The amount of deflection can be calculated by the following formula as given in for example Vacuum Tubes, section 6.6, by Spangenberg, published by McGraw-Hill, 1948.

$$R=1.35\frac{V^{1/2}}{H_y} \qquad (2)$$

where V is the acceleration voltage, $H_y$ is the vertical intensity, and R is the radius. The curved path of the beam results in an apparent shift, $T_0$ of the axial beam which may be equated as follows:

$$T_0=\frac{1}{2}\frac{D^2}{R}=0.370\frac{H_yD^2}{V^{1/2}} \qquad (3)$$

where D is the distance between the plane of deflection and the screen.

The shift of the color center is defined as the amount the color center has been apparently moved by the deflecting force of the earth's magnetic field. In Figure 3, the color center is initially at point C and the color center shift is the distance JC on the plane of deflection determined by the intersection with the plane of deflection of a line drawn tangent to the actual beam path of the electron beams at the point P where the actual beam path intersects the grille.

One embodiment of the above type of post acceleration tube has a V of 6000 volts, D of 13.5 inches, and $H_y$ of 0.600 gauss. Employing Equation 3, it is found that the shift in color center is 0.523 inch. The point of impingement of axial electrons is thus moved 0.523 in the horizontal direction and toward the left of the viewer facing the tube. Or, it can be said that the color has been apparently shifted by 0.523 inch or by about 1.75 phosphor stripes.

It should be noted that the shift due to the vertical intensity component $H_y$ is orientation independent. In any given geographical area the television tube may face any geographical direction and the magnitude of the color shift variations on the screen due to the vertical intensity $H_y$ component do not vary since $H_y$ remains substantially constant. However, the color shift due to the horizontal intensity in conjunction with the vertical intensity will vary dependent on the orientation of the tube as will be explained hereinbelow.

Figure 4:
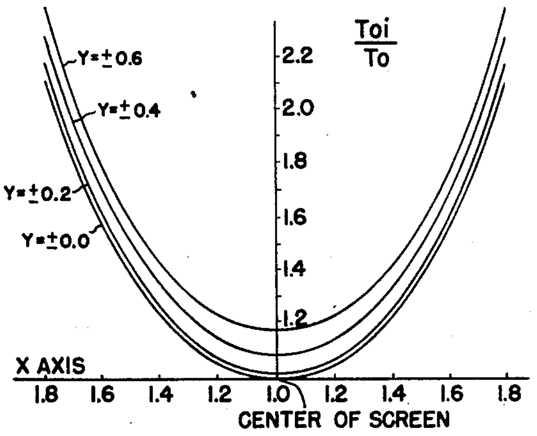
Figure 4 is a graph showing the variation of color center shift along the $x$-axis, due to the vertical intensity component.
Figure 5:
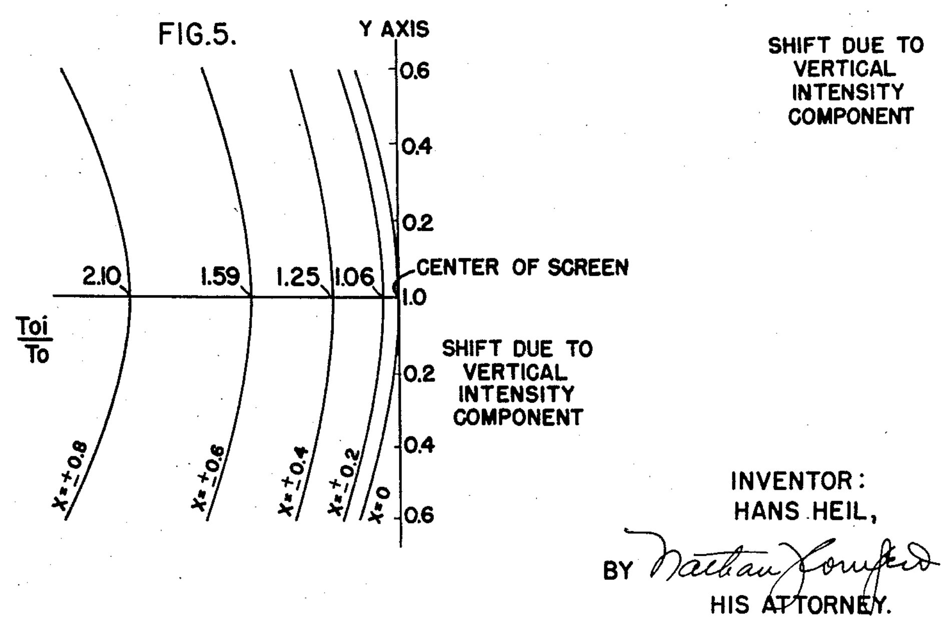
Figure 5 is a graph showing the variation of color center shift along the $y$-axis, due to the vertical intensity component.

One of the principal problems is to compensate for the variation in the amount of shift of the electron beams over the face of the screen. It can be shown that the shift varies along both the vertical axis and along the horizontal axis approximately as the square of the distance from the center of the screen or as a parabola having its apex at the center of the screen. In Figure 4 the amount of color shift is plotted with the axis of ordinates $$\frac{T_{0i}}{T_0}$$

indicating the percentage of color center shift of an electron beam. $T_0$ is the color center shift of an axial beam and $T_{0i}$ is the amount of shift of an electron beam due to the effects of the vertical intensity component of the earth's field. The axis of abscissas is reduced screen co-ordinate $x$ which is equal to $$\frac{X}{D}$$

where X is horizontal distance on the screen in inches and D is the distance between the plane of deflection and the screen, also in inches. The graph is plotted with reduced screen co-ordinates $y$ values as parameters where $y$ is equal to $$\frac{Y}{D}$$

where Y is vertical distance on the screen in inches. For those electron beams impinging on the $x$ axis of the tube, that is $y=0.0$, the amount of shift increases from the center of the screen in both directions to a value on the outer portions of the screen which may be more than twice the amount of shift at the center. The curves for the other values of $y$ are similar to the $y=0$ curve but displaced by approximately the initial $y$ value. The amount of shift in the vertical direction is shown in Figure 5, where the axis of abscissas is the percentage of shift $$\frac{T_{0i}}{T_0}$$

the axis of ordinates are the reduced screen ordinates $y$, and the graph is plotted with $x$ as parameters. For those electron beams impinging on the $y$ axis of the tube, $x=0.0$, the amount of shift increases from the center of the screen in both directions to a value on the top and bottom of the screen which is only slightly more than the amount of shift at the center. The curves for the other values of $x$ are similar to the $X=0$ curve but displaced by approximately the initial value.

The magnitude of the shift variation in the vertical direction is small. The shift of the print master as described hereinbelow corrects for the deflection of the axial beam and this correction has been found to yield a sufficient correction for the y axis variations. The graphs are extended to include points for screens larger than presently employed. In a practical tube the $y$ ordinate reaches values of only 0.4 to 0.5 producing a total variation of only about 3 mils. By overcorrecting in the center, that is, by introducing an error of 1.5 mils in the center in the opposite direction, toward the right in the graph, 1, the maximum error in the outer regions is reduced to only 1.5 mils which error can be tolerated.

Figure 6:
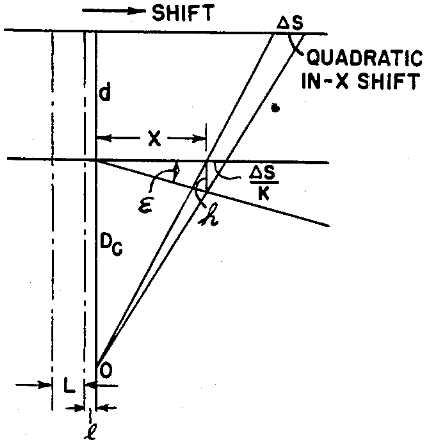
Figure 6 is a diagram showing the variation correction provided by tilting and shifting the mask during printing.

Corrections to compensate for the deflections of the beams may be made during the printing or depositing of the luminescent stripes onto the viewing area. The mechanics of the printing operation are detailed in my co-pending application S.N. 555,368, filed December 14, 1955, and assigned to the same assignee as the present invention. Briefly, the printing may be accomplished in a lighthouse by passing light from an accurately positioned source O on the axis of the lighthouse through predetermined apertures in a master pattern to impinge on a light sensitive surface to mark the positions where the luminescent elements should be disposed. In order to correct for the predetermined deflections of the axial electron beam, and since the deflection is constant for a given geographical area, both the master pattern and the light sensitive surface are moved a distance L from the axis of the lighthouse toward the direction of deflection, Figure 6.

I have found that corrections for the variations of deflection over the face of the tube can be obtained by tilting the master pattern with relation to the sensitive surface. From Figure 6 it can be seen that from the similarity of triangles $$\frac{\Delta s}{Kh}=\frac{x}{D_c}$$

where K is the magnification factor $$1+\frac{d}{D_c}$$

and $d$ is the distance from the master pattern to the light sensitive surface, $D_c$ is the distance between the light source and the master pattern, and $h$ is the side of the triangle parallel to the axis.

Then $h=\epsilon.X$ where $\epsilon$ is the angle of tilt.

Consequently $$\Delta s=K\epsilon\frac{X^2}{D_c}$$

Since $\epsilon$ is a small angle in the order of a fraction of degree higher powers of $\epsilon$ are negligible and for practical purposes can be omitted. Thus tilting the screen will produce variations in the printing which will coincide with the quadratic in X variations of deflection introduced by the vertical intensity of the earth's magnetic field.

A second effect of the earth's magnetic field is caused by the horizontal component as will be discussed hereinbelow.

Reducing the components of the earth's field to components in the tube geometry the following relations are obtained:

$$H_x=H_h \sin \delta$$

$$H_y=H_h \tan i$$

and $$H_z=H_h \cos \delta$$

where $H_x$ is the component in the $x$-direction,
$H_y$ is the component in the $y$-direction, and
$z$ is the component in the $z$ direction in a Cartesian coordinate system, and where $\delta$ is the deviation of the $z$ axis of the tube from magnetic north and $i$ is the aforementioned dip angle.

It can be seen from the above equations that $H_z$, the horizontal component will depend on the orientation of the television set with respect to the earth's magnetic field and the magnitude will vary between plus $H_z$, when the tube is facing north to a minus $H_z$ when the tube is facing south. Thus the amount of shift due to $H_z$ is orientation dependent.

I have observed that the amount of shift due to the horizontal intensity is maximum when the tube is facing north. As the tube is rotated clockwise from north to south, the amount of shift decreases to zero when the tube is facing east, becomes maximum in the opposite sense again when the tube faces south, decreases to zero when the tube is facing east and maximizes on returning to north, Figure 7.

Figure 7:
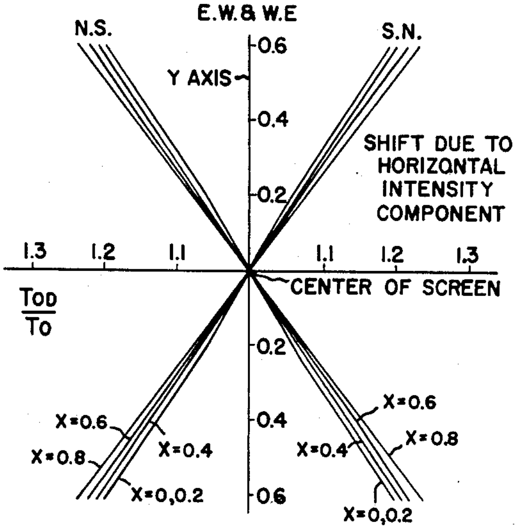
Figure 7 is a graph showing the variation of color center shift along the $y$-axis due to the horizontal intensity component.

In the graph of Figure 7, the axis of abscissas indicates the percentage of color shift with relation to the shift of the axial beam. $T_{0d}$ is the amount of shift introduced to the electron beams due to the orientation of the tube. $T_0$ is the shift of the axial beam due to the vertical component of the earth's field; there is no shift of the axial beam due to the horizontal component. The axis of the ordinates are the aforementioned reduced co-ordinates $y$ and the curves are plotted for various values of $x$. It can be seen that the variations in shifts are practically straight, increasing from zero in the center to the highest magnitude at the four corners.

To correct for the shifts and variations of shifts due to the horizontal component of the earth's field I provide a pair of horizontally disposed coils 31 and 33 spaced in parallel relation and energized by sources of direct current. One of the coils 31 is disposed above the picture tube and another coil 33 is disposed beneath the picture tube in substantial vertical alignment with the first coil. Both coils may be conveniently affixed to the receiver cabinet 27, Figure 8.

Each of the coils consists of a number of turns of wires disposed horizontally. One embodiment employs 40 turns of number 14 wire, American standard gauge size, wound to form a coil approximately two feet square, and having a current of about 2 amperes flowing therethrough; sufficient current to produce approximately a one-fourth of a gauss flux density. The coils have a vertical spacing between them of approximately two feet.

Most dwellings have conditions wherein the principal magnetic field is the earth's field. In those dwellings not having such conditions, for example in buildings having large magnetic structures the coils will also serve as a means for minimizing the degree of color impurity due to the field distorting effects of the magnetic structure.

The two coils are coupled such that the current flow in one coil is in a reversed direction to current flow in the other coil so as to produce opposing magnetic fields. The composite vertical field component, produced by the two coils, is at zero intensity at a horizontal midplane between the two coils and the field increases linearly with perpendicular distance from the plane, Figure 8. The field therefore has color shifting effects matching those shown in Figure 7. The field strength can be adjusted to cancel the shifts due to the horizontal intensity of the earth's field by controlling the current through the coils.

Figure 8:
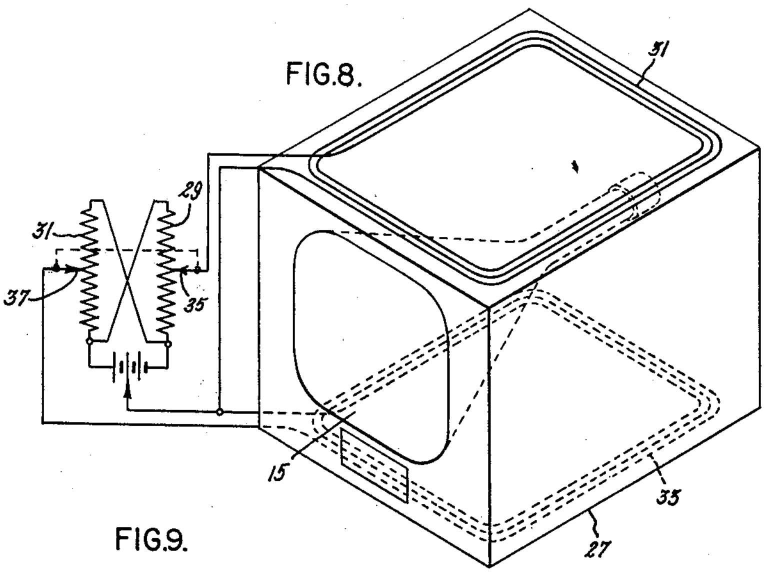
Figure 8 is an outline of a television receiver incorporating the coils of my invention.
Figure 9:
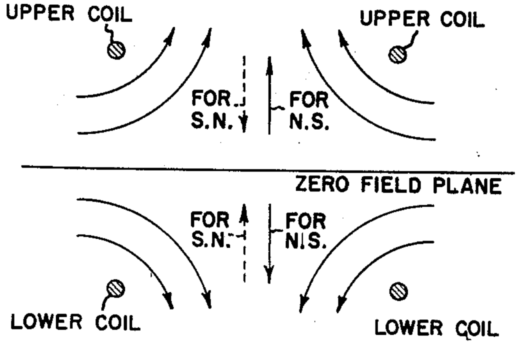
Figure 9 shows the coils in cross section and indicates the field flux lines developed by the coils.

Since the set may be moved around in orientation, an adjustable means, for example, an adjustable potentiometer may be provided to vary the current and hence the field to compensate for variation in the horizontal intensity. One circuit which may be used to vary the currents is shown in Figure 8. Two potentiometers 29 and 31 are cross coupled across a direct current source 33. Taps 35 and 37 on potentiometer 29 and 31 respectively, are ganged to a single control. Due to the electrical cross coupling, movement of the potentiometer will cause a decrease of current in one coil and an increase of current in the other coil.

For a tube facing north the current direction in the top coil is such that a field is developed having lines of flux in an upward direction and the direction of current in the bottom coil is reversed to that of the top coil such a field is developed having lines of flux in a downward direction. For a tube facing south the current direction in both coils is reversed to compensate for these deflections.

For a tube facing east or west no correction need be introduced.

The proper amount of current to produce cancellation of the effects of the earth's field is established by producing a plane field of one color, preferably red, because of a greater sensitivity of red color, on the picture tube. Distortions due to magnetic effects will appear as different color lines on the red background. The potentiometer is varied until the proper amount of current flow through the coils to produce fields to eliminate any distortions.

The correct potentiometer adjustment is the one that provides the smallest current compatible with good purity of color. A correct adjustment for the red field will generally be the right adjustment for the color fields.

For buildings having a magnetic structure which produces a non-homogeneous field, empirical corrections must be made at the site to correct for the deflections and distortions due to the magnetic structure. For this purpose, the simultaneous current adjustment of the two coils may be disconnected and different magnitude currents may be fed to each of the two coils.

While specific examples have been given in describing details of this invention, it will be understood that they have been given merely by way of illustration and that the invention is not limited thereto.

What I claim as new and desire to secure by Letters Patent of the United States is:

1. A color television picture tube of the type having a grille structure interposed between a screen and an electron beam source, said screen having luminescent elements disposed thereon and adapted to be impinged by electron beams, and said elements being translated from a normal position to offset the environmental magnetic field effects on color purity by a composite amount composed of a first distance which is constant for all said elements and a second distance which varies as a square of the distance of the individual element from the center line of the screen.

2. A color television receiver including a picture tube, said tube having an electron gun, beam deflection means, and a luminescent screen adapted to be impinged by electron beams, electromagnetic means correcting for the beam deflecting effects of the horizontal intensity of the earth's magnetic field upon the deflected beam, said electromagnetic means comprising a pair of horizontally disposed wire coils positioned above and below said tube to form a vertically directed linearly graduated magnetic field region therebetween which field traverses said tube in the region of said deflected beam.

3. In a color television receiver including a picture tube of the type employing low voltages to accelerate the electron beams and having beam deflection means, a first electromagnetic coil disposed in a horizontal plane above said tube, a second electromagnetic coil disposed below said tube in parallel relation and beneath said first coil for producing a field in the region wherein said beam has been deflected, said electromagnetic coils being energized by direct currents adjustable in magnitude and direction to provide a linearly graduated magnetic field acting upon the deflected beam to correct for the beam deflecting effects of the earth's magnetic field.

4. In a color television receiver having a picture tube including a screen composed of a plurality of triplets of different color producing luminescent materials adapted to be impinged by beams of electrons, a first electromagnetic coil disposed in a substantially horizontal plane above said tube, a second electromagnetic coil disposed below said tube in substantial parallel relation to said first coil, said first electromagnetic coil adapted to be energized by direct current adjustable in magnitude and in direction of flow, and said second electromagnetic coil adapted to be energized by a direct current adjustable in magnitude and in direction of flow, the current in one of said coils being in a direction reversed to the current in the other coil such as to provide a midplane of zero field intensity therebetween.

5. A cathode ray tube of the type having a screen, a source of electron beams, and a grille structure interposed therebetween, said screen having luminescent elements disposed thereon arranged for excitation by beams from said source, said elements being individually transversely offset relative to said grille from a normal position by an increment increasing as a second power function of the transverse distance of each element from the center of the screen in an amount to compensate for variations in the transverse shift, as the beam is transversely swept over the face of the screen, arising from a component of a substantially homogeneous magnetic field perpendicular to said transverse direction.

6. A cathode ray tube of the type having a screen, a source of electron beams, and a grille structure interposed therebetween, said screen having luminescent elements disposed thereon arranged for excitation by beams from said source, said elements being translated in a horizontal direction relative to said grille in an amount to compensate for the center horizontal shift of the electron beam under the influence of the vertical intensity component of the earth's magnetic field and said elements being additionally individually horizontally offset from a normal position by an increment increasing as a second power function of the horizontal distance of each element from the center of the screen in an amount to compensate for variations in the horizontal shift, when the beam is horizontally deflected over the face of the screen, arising from the vertical intensity component of the earth's magnetic field.

7. A cathode ray tube of the type having a screen, a source of electron beams, a grille structure interposed therebetween, said screen having luminescent elements disposed thereon arranged for excitation by beams from said source, said elements being translated in a horizontal direction relative to said grille in an amount to compensate for the center horizontal shift of the electron beam under the influence of the vertical intensity component of the earth's magnetic field and said elements being additionally individually horizontally offset from a normal position by an increment increasing as a second power function of the horizontal distance of each element from the center of the screen in an amount to compensate for variations in the horizontal shift, when the beam is horizontally deflected over the face of the screen, arising from the vertical intensity component of the earth's magnetic field, and a first electromagnetic coil disposed in a horizontal plane above said tube and a second electromagnetic coil disposed in a horizontal plane below said tube, said electromagnetic coils being energized to produce oppositely directed vertical magnetic fields to provide a vertical magnetic field whose intensity increases as a linear function of its vertical distance from the center of said screen for compensation of the horizontal shift arising from the horizontal intensity component of the earth's field which increases as a linear function of the vertical distance of the beam from the center of the screen.

8. In a color television receiver including a picture tube having a luminescent screen adapted to be impinged upon by electron beams, a first electromagnetic coil disposed in a horizontal plane above said tube, a second electromagnetic coil disposed below said tube in parallel relation to said first coil, said electromagnetic coils being energized by direct currents to create oppositely directed magnetic fields to correct for the electron deflecting effects of the horizontal component of earth's magnetic field.

9. In a color television receiver including a picture tube having a luminescent screen adapted to be impinged upon by electron beams, electromagnetic means for compensating for the beam deflecting effects of a component of a homogeneous magnetic field acting transversely to said tube axis, said electromagnetic means comprising a pair of spaced parallel coils arranged about said picture tube for creating a field directed transversely to the plane common to said axis and said component and graduated in intensity in the direction of said field.

10. The combination set forth in claim 9 wherein said spaced parallel coils are energized to create oppositely directed magnetic fields.

11. In combination, a cathode ray tube having an electron gun projecting an electron beam along an axis of the tube, beam deflection means, and a luminescent screen adapted to be impinged upon by the electron beam, and at least two spaced parallel coils for direct current energization arranged on opposite sides of said axis for producing a linearly graduated magnetic field acting upon said deflected beam and directed transversely to the axis of said tube for correcting for the effects upon the deflected beam of an extraneous homogeneous field.

References Cited in the file of this patent

UNITED STATES PATENTS

| | | |
|---|---|---|
| 2,164,906 | Deserno | July 4, 1939 |
| 2,387,608 | Paumier | Oct. 23, 1945 |
| 2,435,889 | Kerridge | Feb. 10, 1948 |
| 2,446,248 | Shrader | Aug. 3, 1948 |
| 2,446,915 | Filmer | Aug. 10, 1948 |
| 2,568,448 | Hansen | Sept. 18, 1951 |
| 2,612,614 | Amdursky | Sept. 30, 1952 |
| 2,719,249 | Friend | Sept. 27, 1955 |
| 2,727,828 | Law | Dec. 20, 1955 |
| 2,733,366 | Grimm | Jan. 31, 1956 |
| 2,755,402 | Morrell | July 17, 1956 |

OTHER REFERENCES

Klemperer: "Electron Optics," Cambridge University Press, 1953, pages 126 and 127.